(12) United States Patent
Binder et al.

(10) Patent No.: US 7,419,740 B2
(45) Date of Patent: Sep. 2, 2008

(54) MEMBRANE ELECTRODE UNIT FOR POLYMER ELECTROLYTE FUEL CELLS AND A PROCESS FOR THE PRODUCTION THEREOF

(75) Inventors: Matthias Binder, Hasselrogh-Niedermittlau (DE); Ralf Zuber, Grossostheim (DE); Markus Vogt, Frankfurt (DE); Gerhard Heinz, Hasselroth-Niedermittlau (DE)

(73) Assignee: Unicore AG & Co. KG, Hanau - Wolfgang (DE)

( * ) Notice: Subject to any disclaimer, the term of this patent is extended or adjusted under 35 U.S.C. 154(b) by 0 days.

(21) Appl. No.: 09/907,961

(22) Filed: Jul. 19, 2001

(65) Prior Publication Data

US 2002/0037449 A1   Mar. 28, 2002

(30) Foreign Application Priority Data

Jul. 29, 2000  (DE) .............................. 100 37 072

(51) Int. Cl.
*H01M 4/90* (2006.01)
*H01M 4/86* (2006.01)
*H01M 4/88* (2006.01)
*H01M 8/02* (2006.01)
*H01M 8/10* (2006.01)

(52) U.S. Cl. ............................. 429/40; 429/42; 429/44; 502/101

(58) Field of Classification Search .................. 429/30, 429/40, 42, 44; 502/101, 103, 185
See application file for complete search history.

(56) References Cited

U.S. PATENT DOCUMENTS

| 4,229,490 A | 10/1980 | Frank et al. |
| 4,654,104 A * | 3/1987 | McIntyre et al. ............ 156/276 |
| 4,876,115 A | 10/1989 | Raistrick |
| 5,234,777 A | 8/1993 | Wilson |
| 5,501,915 A | 3/1996 | Hards et al. |
| 5,723,173 A | 3/1998 | Fukuoka et al. |
| 5,738,905 A * | 4/1998 | Bevers ....................... 427/115 |
| 5,861,222 A | 1/1999 | Fischer et al. |
| 6,156,449 A | 12/2000 | Zuber et al. |

FOREIGN PATENT DOCUMENTS

| CA | 2280601 A * | 2/2000 |
| DE | 196 02 629 A1 | 8/1996 |
| DE | 197 57 320 A1 | 7/1999 |
| DE | 198 15 455 A1 | 10/1999 |
| EP | 0 731 520 A | 9/1996 |

(Continued)

OTHER PUBLICATIONS

European Search Report that issued in related EP Appln. No. 0111 5252.7 dated Nov. 23, 2005.

*Primary Examiner*—Gregg Cantelmo
(74) *Attorney, Agent, or Firm*—Kalow & Springut LLP; John J. Santalone

(57) ABSTRACT

A membrane electrode assembly for polymer electrolyte fuel cells consisting of a polymer electrolyte membrane, both faces of which are in contact with porous reaction layers and gas distributor layers. The reaction layers contain noble metal catalysts supported on carbon and a proton-conducting polymer, a so-called ionomer. At least one of the two reaction layers also contains a noble metal black.

18 Claims, 3 Drawing Sheets

FOREIGN PATENT DOCUMENTS

| | | |
|---|---|---|
| EP | 0 797 265 A2 | 9/1997 |
| EP | 0 945 910 A2 | 11/1999 |
| JP | 570 19971 A | 2/1982 |
| JP | 582 18771 A | 12/1983 |
| JP | 602 303 57 A | 11/1985 |
| JP | 07 296818 | 11/1995 |
| JP | 102 700 50 A | 10/1998 |
| JP | 10270055 A * | 10/1998 |
| JP | 10270056 A * | 10/1998 |

* cited by examiner

MEMBRANE ELECTRODE UNIT FOR POLYMER ELECTROLYTE FUEL CELLS AND A PROCESS FOR THE PRODUCTION THEREOF

BACKGROUND

1. Field of the Invention

The invention provides fuel cells, in particular PEM fuel cells in which a solid polymer is used as electrolyte.

2. Description of Prior Art

Fuel cells convert a fuel and an oxidising agent which are spatially separated from each other at two electrodes into electricity, heat and water. Hydrogen or a hydrogen-rich gas may be used as the fuel and oxygen or air as the oxidising agent. The process of energy conversion in the fuel cell is characterised by particularly high efficiency. For this reason, fuel cells in combination with electric motors are becoming more and more important as an alternative to traditional internal combustion engines.

The so-called polymer electrolyte fuel cell (PEM fuel cell) is suitable for use as an energy converter in motor vehicles because of its compact structure, its power density and its high efficiency.

The PEM fuel cell consists of a stacked arrangement ("stack") of membrane electrode assemblies (MEAs), between which are arranged bipolar plates for supplying gas and conducting electrical current. A membrane electrode assembly consists of a polymer electrolyte membrane, to both sides of which are applied reaction layers and gas distributor layers. One of the reaction layers is designed as an anode for the oxidation of hydrogen and the second reaction layer is designed as a cathode for the reduction of oxygen. The arrangement of reaction layer and gas distributor layer is called an electrode for the membrane electrode assembly in the context of this invention. The gas distributor layers usually consist of carbon fibre paper or a non-woven carbon cloth and facilitate good access by the reaction gases to the reaction layers and effective removal of the cell current. The reaction layers for anodes and cathodes contain so-called electrocatalysts which catalytically support the particular reaction (oxidation of hydrogen or reduction of oxygen). Metals from the platinum group in the Periodic Table of Elements are preferably used as the catalytically active components. In the majority of cases, so-called supported catalysts, in which the catalytically active platinum group metal has been applied in highly dispersed form to the surface of a conductive support material, are used. The average crystallite size of the platinum group metals is between about 1 and about 10 nm. Finely divided carbon blacks have proved useful as support materials.

The polymer electrolyte membrane consists of proton-conducting polymer materials. These materials are also called ionomers for short in the following. A tetrafluoroethylene/fluorovinylether copolymer with acid functions, in particular sulfonic acid groups, is preferably used. Such a material is sold, for example, under the tradename Nafion® by E.I. DuPont. However, other, in particular fluorine-free, ionomer materials such as sulfonated polyetherketones or arylketones or polybenzimidazoles may also be used.

U.S. Pat. No. 4,229,490 discloses a process for producing a fuel cell electrode. This process comprises hydrophobizing a carbon fibre paper and then coating with a graphite/platinum black/PTFE mixture and sintering. Fuel cell electrodes produced in this way have a high platinum load and do not contain a proton-conducting polymer. Thus only a small part of the platinum used is contacted in such a way that it can take part in the electrolytic process.

U.S. Pat. No. 4,876,115 describes a process for treating a porous gas diffusion electrode which has a catalyst load of less than 0.5 mg/cm$^2$ on carbon particles. The electrode is impregnated with a solution of a proton-conducting material. This coats the surfaces of the carbon particles with the proton-conducting material.

U.S. Pat. No. 5,234,777 discloses a membrane electrode assembly which consists of a polymer electrolyte membrane and a layer formulated from a platinum supported catalyst and an ionomer. This layer is characterized in that it is less than 10 µm thick and the platinum supported catalyst is dispersed uniformly in the proton-conducting ionomer. The platinum load on the electrode is less than 0.35 mg/cm$^2$. The electrode layers are in contact with the polymer electrolyte membrane.

Various processes are described for producing membrane electrode assemblies according to U.S. Pat. No. 5,234,777. In one embodiment, the Pt/C supported catalyst is dispersed in an alcoholic solution of the ionomer. This dispersion, also called an ink, is applied to a PTFE film release blank (PTFE: polytetrafluorethylene), dried and laminated onto the opposite faces of a polymer electrolyte membrane by hot pressing.

In another embodiment, the polymer electrolyte membrane is coated directly with an ink of a Pt/C supported catalyst and a solution of an ionomer. The applied layer is dried at a temperature of at least 150° C.

The reaction layers according to U.S. Pat. No. 5,234,777 are characterized by a homogeneous distribution of catalyst in the ionomer. As a result of hot pressing, dense and pore-free layers with a thickness of less than 10 µm, preferably 5 µm and with platinum loads of less than 0.35 mg Pt/cm$^2$ are produced. In the case of membrane electrode assemblies according to U.S. Pat. No. 5,234,777, due to the dense, pore-free reaction layer, access by the reaction gases to the catalyst is restricted. This has a negative effect on the electrochemical performance of the PEM cell, in particular when operating with dilute gases such as air or reformate gas. The possible use of air and reformate gas instead of oxygen and hydrogen, however, is an important prerequisite for the economically viable use of fuel cells in motor vehicles.

A further disadvantage of the process described in U.S. Pat. No. 5,234,777 is the high drying temperature of at least 150° C. Under these conditions, solvent vapours in contact with the catalyst layers can ignite and destroy the membrane electrode assembly.

DE 196 02 629 A1 discloses a process for producing a membrane electrode assembly in which a noble metal catalyst on a carbon support is used, on which the ionomer is adsorbed as a colloid. To achieve this, a colloidal solution of the ionomer is prepared in a suitable organic solvent and the supported catalyst is treated therewith. The supported catalyst coated with colloid is processed to form an ink and an electrode is prepared therewith which is compression moulded with the polymer electrolyte membrane.

Membrane electrode assemblies produced according to DE 196 02 629 A1, however, do not exhibit improved access by the reaction gases to the catalyst. Furthermore, it is difficult to achieve defined and reproducible distribution of the ionomer in colloidal form on the supported catalyst. The stability of the colloidal ionomer is limited. Transfer of the process to mass-production is thus possible to only a limited extent.

EP 0 797 265 A1 describes a membrane electrode assembly for PEM fuel cells with a high total porosity and improved electrochemical performance. The high porosity is achieved by using pore-producers in combination with a specific spray process. The process has the disadvantage that the pore-producers lead to contamination and additional steps are required in order to remove the pore-producers from the membrane electrode assembly.

For wide commercial use of PEM fuel cells in motor vehicles, further improvement in the electrochemical cell performance and a clear reduction in the system costs is required. This is a prerequisite for electrical drives using power supplied by fuel cells being able to compete successfully with traditional internal combustion engines.

In order to increase the efficiency, the performance of fuel cells when operated under a part load, that is to say at low current density, must be further increased. In order to achieve this, the structure of the reaction layers containing the electrocatalyst has to be further improved.

SUMMARY OF THE INVENTION

An object of the present invention is to provide an improved membrane electrode assembly and processes for the production thereof which avoid the disadvantages described in the prior art. In particular, an object is to increase the activity of the reaction layer and thus to enable improved utilization of the noble metal catalyst.

The above and other objects of the invention can be achieved by a membrane electrode assembly for polymer electrolyte fuel cells comprising a polymer electrolyte membrane which has a first and a second face which are both in contact with porous reaction layers and gas distributor layers, wherein the reaction layers contain noble metal catalysts supported on carbon and an ionomer. The membrane electrode assembly is characterized in that at least one of the two reaction layers also contains a noble metal black.

A noble metal black, in the context of this invention, is understood to be a highly dispersed, support-free, noble metal powder which has a high specific surface area.

Membrane electrode assemblies according to the invention exhibit increased activity of the reaction layer which has an effect in the form of increased performance, in particular when operating the cell at low current density, that is to say with a particularly high utilization of the fuel.

This increase in performance is achieved in that the reaction layer according to the invention contains a mixture of a noble metal supported catalyst and a noble metal black which is dispersed in a porous matrix of a proton-conducting ionomer. A tetrafluoroethylene/fluorovinylether copolymer with acid groups is preferably used as ionomer. The arrangement described here of a reaction layer consisting of a noble metal black and a supported catalyst can be used both for the cathode and for the anode in the membrane electrode assembly.

The proportion of noble metal black in the total noble metal content of the reaction layer being considered is between 10 and 90 wt. %, preferably between 40 and 90 wt. %.

In a particular embodiment of the invention, the reaction layer containing noble metal black may itself again consist of several sub-layers on top of each other, wherein the mixture of noble metal black and noble metal catalyst supported on carbon is present in at least one of the sub-layers, while the other sub-layers may contain other catalysts. A double layer arrangement has proven especially useful, wherein the sub-layer which is directly in contact with the ionomer membrane contains the mixture of noble metal black and supported noble metal catalyst, while the second sublayer is provided with a further electrocatalytically active and supported noble metal catalyst. As an alternative, the noble metal black and supported noble metal catalyst may also be arranged in separate sublayers.

The total thickness of the reaction layer according to the invention is between 5 and 100, preferably between 10 and 50 μm.

Any supported catalysts known from the field of fuel cells may be used as catalysts. Finely divided, electrically conductive carbon is used as support material. Carbon black, graphite or active carbon are preferably used. The supported catalysts used may contain 50 to 80, preferably 30-60, wt. % of noble metal with respect to the total weight of the supported catalysts.

The noble metal black used has a noble metal surface area of at least 15 $m^2/g$ of noble metal, preferably at least 30 $m^2/g$.

Noble metals which are suitable for the supported catalysts and also for the noble metal blacks are metals from the platinum group: platinum, palladium, rhodium or alloys thereof. They may contain ruthenium, cobalt, chromium, tungsten, molybdenum, vanadium, iron, copper and nickel, alone or in combination, as further alloying additives.

Depending on the layer thickness of the electrode, concentrations of noble metal per assembly area in the reaction layers are advantageously between 0.01 and 5 mg of noble metal/$cm^2$.

To produce the membrane electrode assembly according to the invention, the following process may be used:
a) application of the reaction layer containing noble metal black to the first face of the polymer electrolyte membrane, comprising the following steps:
   making up an ink by mixing the noble metal black and the supported noble metal catalyst in a solution of proton-conducting ionomer in a solvent,
   dispersing and homogenising the ink,
   coating the first face of the polymer electrolyte membrane with the ink,
   finishing the reaction layer by drying the coating,
b) application of the second reaction layer to the second face of the polymer electrolyte membrane and
c) placing the reaction layers in contact with the gas distributor layers.

The concentration of the ionomer in the solution is preferably 1 to 10 wt. %, with respect to the total weight of solution. On drying the ink, the solvent evaporates and produces a reaction layer with high porosity and high activity.

Any media which can dissolve the ion-conducting polymer used are suitable as solvents. These may be polar, aprotic solvents such as dimethyl formamide or dimethyl sulfoxide. Monohydric and polyhydric alcohols, glycols and glycol ether alcohols and glycol ethers are also suitable. Examples of suitable monohydric or polyhydric alcoholic solvents are isopropanol, propylene glycol, dipropylene glycol, glycerine, hexylene glycol.

Known auxiliary devices such as, for example, high-speed stirrers, ultrasound baths or triple roll mills may be used for dispersing and homogenising the ink.

The homogenized ink may be applied to the polymer electrolyte membrane by various techniques. These include, for example, spraying, brushing, spreading or printing.

Drying the applied reaction layers should take place at temperatures between 60 and 140, preferably between 70 and 120° C. The reaction layers have thicknesses between 5 and 100, preferably between 10 and 50 μm. With a thickness of less than 5 μm, the layer is irregular due to its porous structure. This results in a reduced electrical conductivity. With thicknesses of greater than 100 μm, the electrochemical effectiveness of the reaction layer decreases greatly. For the most frequently used cases, layers with a thickness between 15 and 50 μm have proven especially useful.

Polymer electrolyte membranes and also the ionomer contained in the reaction layers may be used in an acidic, proton-conducting, H+ form or, after exchange of the protons for monovalent ions such as for example Na+ and K+, in a non-acidic Na+ or K+ form to produce membrane electrode assemblies. The non-acidic form of polymer membranes is usually more stable towards thermal stress than the acidic form and is therefore preferably used. Before using the membrane electrode assembly, however, the polymer electrolyte has first to be returned to its acidic, proton-conducting form. This is achieved by so-called reprotonation. Reprotonation is performed by treating the membrane electrode assemblies in sulfuric acid.

The production process described may be varied in a number of ways. Thus, it is not absolutely essential to apply the reaction layers directly to the polymer electrolyte membrane. Instead, they may be applied to the gas distributor layers and only later be combined with the polymer electrolyte membrane to form a membrane electrode assembly.

BRIEF DESCRIPTION OF DRAWINGS

The present invention will be further understood with reference to the accompanying drawings, wherein.

DETAILED DESCRIPTION OF INVENTION

Figure 1:
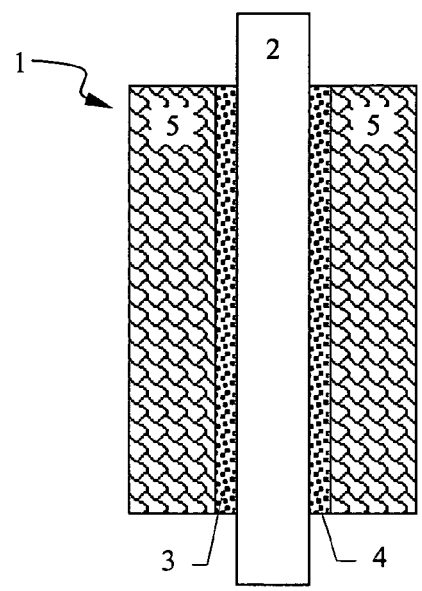
FIG. 1 is a schematic representation of the structure of a membrane electrode assembly according to the invention.

FIG. 1 shows the structure of a membrane electrode assembly (1). (2) denotes the proton-conducting ionomer membrane. This membrane is coated on both faces with the reaction layers (3) and (4), one of which forms the anode while the second forms the cathode in the membrane electrode assembly. The reaction layers contain noble metal catalysts which oxidize the hydrogen supplied as fuel to the anode layer and reduce the oxygen in the cathode layer with the formation of water. If a gaseous mixture of hydrogen, carbon dioxide and small amounts of carbon monoxide, obtained by reforming hydrocarbons, is used as fuel, then a platinum/ruthenium alloy catalyst (PtRu/C) supported on carbon particles is generally used as anode catalyst, this having a better resistance to poisoning by carbon monoxide than pure platinum catalysts on carbon particles (Pt/C). A Pt/C supported catalyst is commonly used in the prior art as the cathode catalyst.

To supply the reaction layers (3) and (4) with the reaction media and also with water to moisten the ionomer membrane and to remove the reaction products and unconsumed reaction media, the reaction layers are placed in contact with so-called gas distributor layers (5). These are generally porous and electrically conductive carbon fibre papers or woven or non-woven carbon felts.

Figure 2:
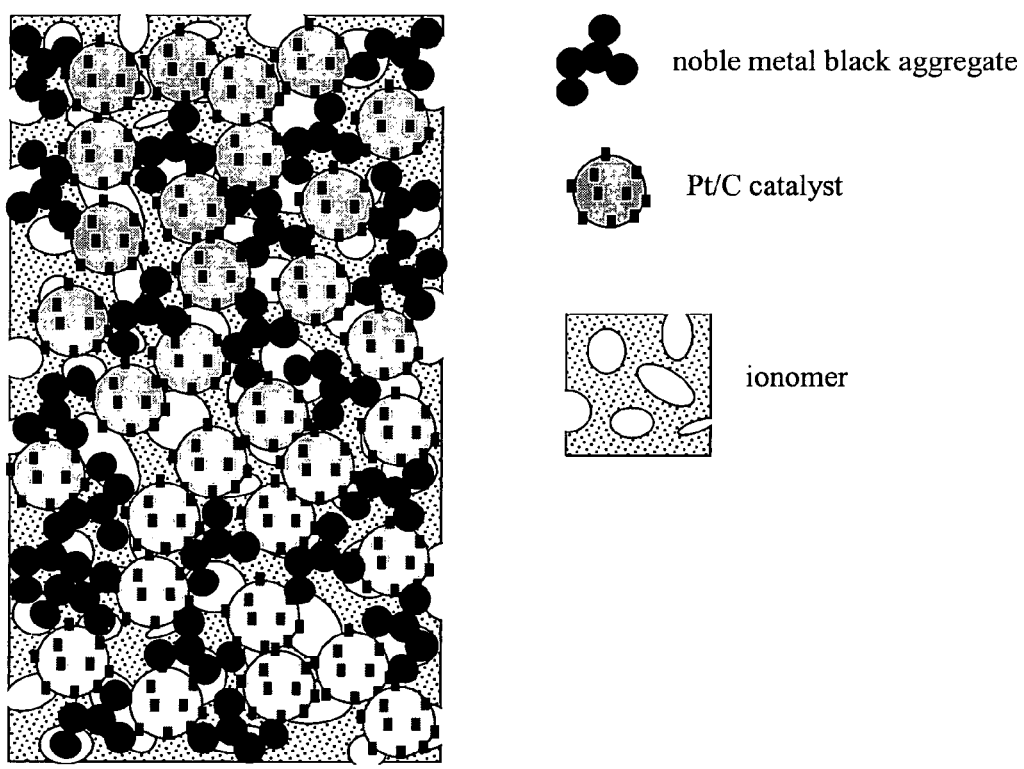
FIG. 2 is a schematic representation of the structure of a reaction layer with a mixture of noble metal black and Pt/C supported catalyst in one layer in accordance with the invention.

FIG. 2 is a schematic diagram of the structure of a reaction layer according to the invention which contains a mixture of a Pt/C supported catalyst and a noble metal black in an ionomer. The noble metal black is normally present in the form of primary metal particles which have grown to form larger aggregates. The Pt/C supported catalyst contains platinum nanoparticles (shown as black rectangles in FIG. 2) on the surface of finely divided carbon particles, usually carbon black.

Examples 1 to 2 describe the production of membrane electrode assemblies according to the invention, while comparison example VB1 gives the production of a membrane electrode assembly without the addition of a noble metal black.

The polymer electrolyte membranes and the ionomer for the reaction layers were each used in their non-acidic form and converted back into their acidic, proton-conducting modification with the aid of sulfuric acid after completion of the production process.

To produce membrane electrode assemblies according to the invention and the membrane electrode assembly according to comparison example VB1, the following inks were made up:

| Ink A: | Catalyst | 40% Pt on carbon black Vulcan ® XC 72 | 5.53 g |
|---|---|---|---|
| | Nafion solution | 4.2 wt. % in propylene glycol | 43.92 g |
| | Sodium hydroxide solution | 15 wt. % in water | 0.59 g |
| Ink B: | Catalyst: | 40% PtRu (1:1) on carbon black Vulcan ® XC 72 | 5.45 g |
| | Nafion solution | 4.2 wt. % in propylene glycol | 43.13 g |
| | Sodium hydroxide solution | 15 wt. % in water | 0.59 g |
| Ink C: | Catalyst: | 40% Pt on carbon black Vulcan ® XC 72 | 5.12 g |
| | Platinum black | 40 m$^2$/g | 5.12 g |
| | Nafion solution | 4.2 wt. % in propylene glycol | 40.46 g |
| | Sodium hydroxide solution | 15 wt. % in water | 0.55 g |

The particular constituents in the formulations given above were blended with each other and then carefully homogenized using a triple roll mill.

Catalyst-ink B was used in each of the following examples to prepare the anode layers, while inks A and C were used to prepare the cathode layers.

COMPARISON EXAMPLE 1

VB1

Ink A was printed onto a Nafiong 112 membrane (thickness 50 μm) in the Na+ form in a screen printing process and dried at 90° C. Then the rear face of the membrane was coated in the same way with catalyst ink B. Reprotonation was performed in 0.5 M sulfuric acid. The platinum load in the cathode layer was 0.4 mg Pt/cm$^2$, that in the anode layer was 0.3 mg Pt/cm$^2$. That corresponds to a total load on the membrane coated with platinum of 0.7 mg/cm$^2$. The thickness of the layers was in the range between 15 and 20 μm. Each printed area was 50 cm$^2$.

After coating the membrane, gas distributor layers were applied to the anode and cathode layer in order to produce the membrane electrode assembly.

Hydrophobized carbon fibre papers coated with a fine-pored layer of carbon black, a so-called levelling layer, were used as gas distributor layers. The carbon fibre papers were first impregnated with a PTFE dispersion (Hostaflon TF5235 from Dyneon) in an immersion process, dried and calcined at 350° C. The PTFE content of the anode gas distributor layer was 16 wt. % and that of the cathode gas distributor layer was 8 wt. %. Then these carbon fibre papers were coated on one face with a paste of carbon black Vulcan XC72 and PTFE, dried and again calcined. The ratio by weight of carbon black to PTFE in this paste was 7:3. The rate of application of the dried paste was 2.5 mg/cm$^2$.

The carbon fibre papers treated in this way were then applied to the anode and cathode layers in order to form the membrane electrode assembly.

EXAMPLE 1

Ink C was printed onto a Nafion® 112 membrane in the Na$^+$ form in a screen printing process and dried at 90° C. Then the rear face of the membrane was coated with catalyst ink B in the same way. Reprotonation was performed in 0.5 M sulfuric acid. The platinum load in the cathode layer was 0.35 mg Pt/cm$^2$, that in the anode layer was 0.3 mg Pt/cm$^2$. That corresponded to a total load on the membrane coated with platinum of 0.65 mg/cm$^2$. The thickness of the layers was in the range between 10 and 20 μm. Each printed area was 50 cm$^2$.

To make up the membrane electrode assembly according to the invention, the coated membrane was placed in contact with gas distributor layers as described in comparison example 1.

EXAMPLE 2

Ink C was printed onto a Nafion® 112 membrane in the Na$^+$ form in a screen printing process and dried at 90° C. Then further coating of this face was performed using ink A. Then the rear face of the membrane was coated with catalyst ink B in the same way. Reprotonation was performed in 0.5 M sulfuric acid. The platinum load in the cathode layer was 0.45 mg Pt/cm$^2$, that in the anode layer was 0.3 mg Pt/cm$^2$. That corresponded to a total load on the membrane coated with platinum of 0.75 mg/cm$^2$. The thickness of the layers was in the range between 15 and 20 μm. Each printed area was 50 cm$^2$.

To make up the membrane electrode assembly according to the invention, the coated membrane was placed in contact with gas distributor layers as described in comparison example 1.

Figure 3:
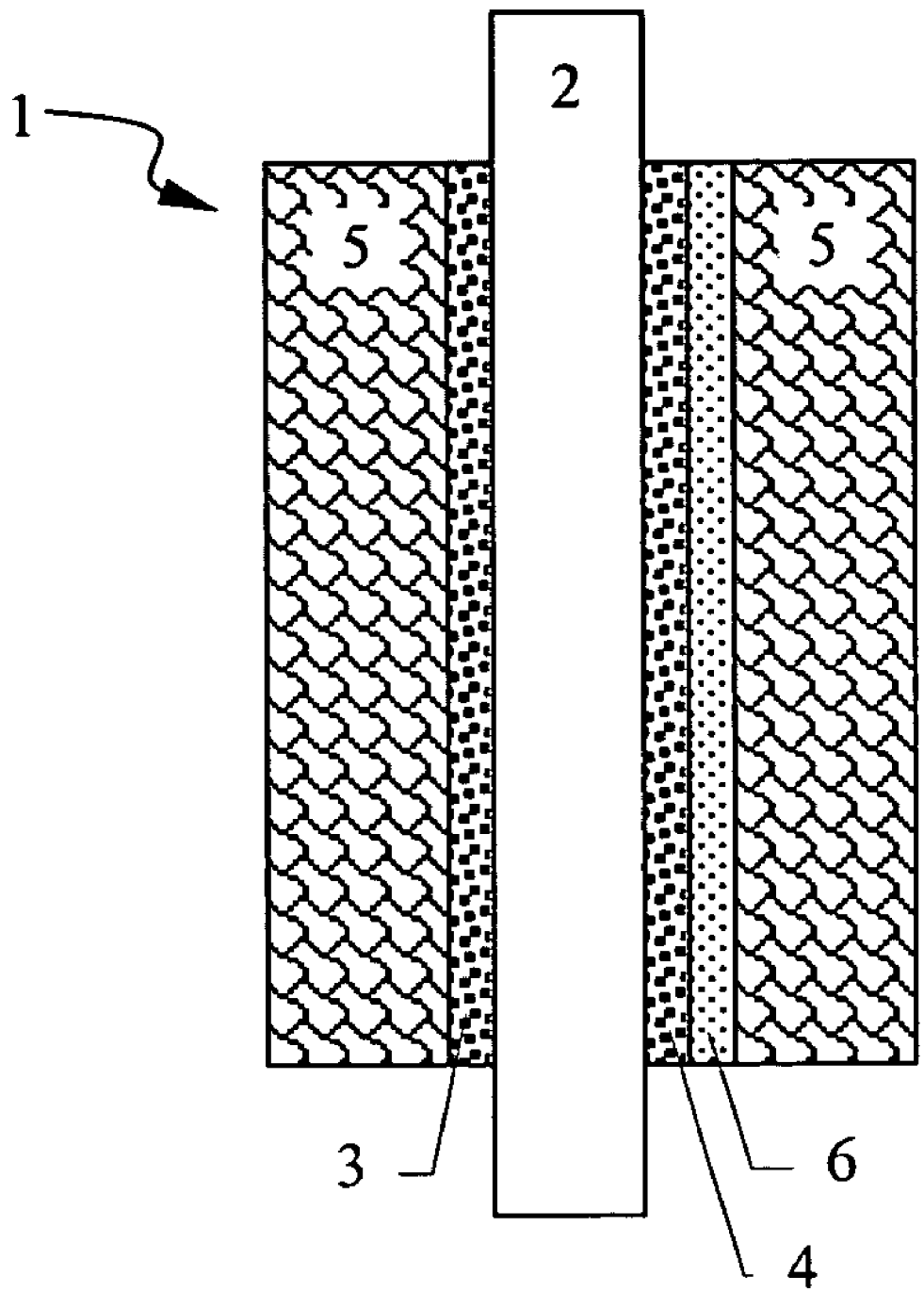
FIG. 3 is a schematic representation of the structure of the double layer arrangement in example 2.

The structure of the membrane electrode assembly produced in this way is shown schematically in FIG. 3. The anode layer (3) contains the PtRu/C catalyst from catalyst ink B. The cathode for the membrane electrode assembly is composed of two reaction layers, wherein the layer (4) adjacent to the membrane contains a mixture of Pt/C supported catalyst and platinum black and was prepared using ink C. The second reaction layer (6) was prepared using ink A and thus contained only the Pt/C supported catalyst as catalyst.

Determining the Electrochemical Properties:

All the membrane electrode assemblies were tested in a PEM fuel cell with an electrode area of 50 cm$^2$ and operated with hydrogen/air (1 bar/1 bar) under no pressure. The cell temperature was 70° C. The reaction gases hydrogen and air were each saturated with water vapour at 70° C. in a moistener. The gas flow was adjusted to a stoichiometry of 1.5 for hydrogen and 2.0 for air at a current density of 1 A/cm$^2$.

Figure 4:
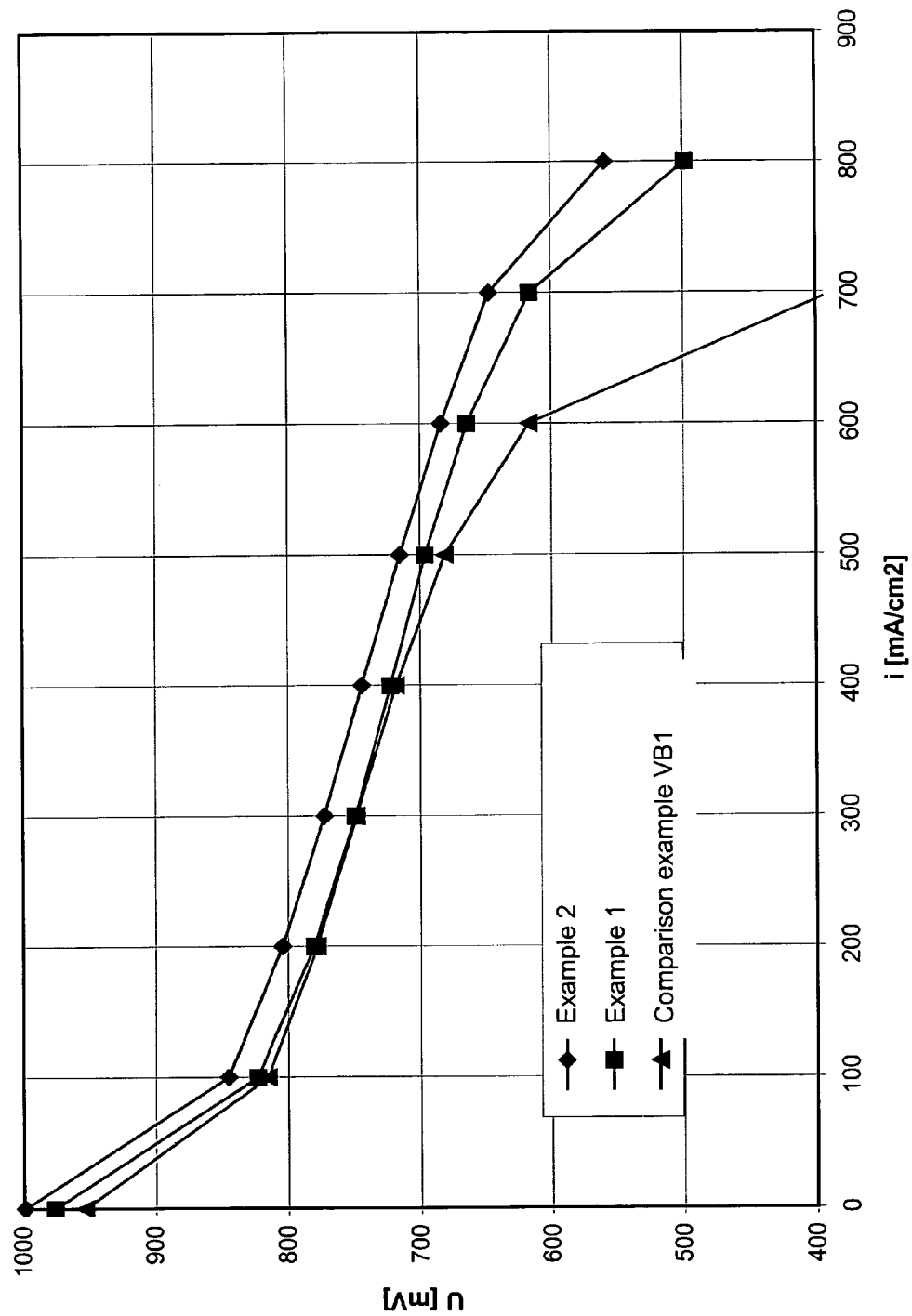
FIG. 4 is a graph depicting the variation of cell voltage with current density when operating with hydrogen/air for the MEAs in examples 1 and 2 and in comparison example 1.

The variation in cell voltages with current density when operating with air are given in FIG. 4 for the cells from comparison example 1 and examples 1 and 2. It can be seen that the membrane electrode assemblies according to the invention provide a clearly improved electrical performance as compared with the prior art (VB1). This applies in particular for the range of low current density, in which high efficiency for energy conversion is typically striven.

Table 3 shows the cell voltages measured when loading the cells with a current density of 100 mA/cm$^2$ and 500 mA/cm$^2$.

TABLE 3

| | Cell voltages when operating with hydrogen/air at 100 and 500 mA/cm$^2$ | |
|---|---|---|
| Example | Cell voltage at 100 mA/cm$^2$ [mV] | Cell voltage at 500 mA/cm$^2$ [mV] |
| Comparison example 1 | 815 | 681 |
| Example 1 | 823 | 696 |
| Example 2 | 845 | 715 |

Further variations and modifications of the foregoing will be apparent to those skilled in the art and are intended to be encompassed by the claims appended hereto.

German priority application 100 37 072.1 is relied on and incorporated herein by reference.

We claim:

1. A membrane electrode unit for polymer electrolyte fuel cells comprising a polymer electrolyte membrane, which has an anode side and a cathode side each of which is in contact with a porous reaction layer and gas distributor layer, wherein each of the two reaction layers contains a noble metal catalyst supported on carbon and an ionomer, and wherein the reaction layer on the cathode side comprises at least two sublayers, a first sublayer and a second sublayer, on top of each other, wherein the first sublayer is in direct contact with the polymer electrolyte membrane and contains a noble metal black and a noble metal catalyst supported on carbon and the second sublayer contains a further supported noble metal catalyst.

2. A membrane electrode unit according to claim 1, wherein the proportion of noble metal black is 10 to 90 weight percent of the total noble metal content of the reaction layer in which the noble metal black is contained.

3. A membrane electrode unit according to claim 1, wherein the at least two sublayers comprises several sublayers on top of each other, wherein the noble metal black and the noble metal catalyst supported on carbon are located in separate sublayers.

4. A membrane electrode unit according to claim 1, wherein the total thickness of a reaction layer is between 5 and 100 μm.

5. A membrane electrode unit according to claim 4, wherein the total thickness of a reaction layer is between 10 and 50 μm.

6. A membrane electrode unit according to claim 1, wherein the ionomer is a tetrafluorethylene/fluorovinylether copolymer with acid groups.

7. A membrane electrode unit according to claim 1, wherein the noble metal content of each electrode is 0.01 to 5 mg metal/cm$^2$.

8. A membrane electrode unit according to claim 1, wherein the noble metal catalyst supported on carbon contains a platinum group metal selected from the group consisting of platinum, palladium, rhodium and alloys of these platinum group metals.

9. A membrane electrode unit according to claim 8, wherein the noble metal catalyst supported on carbon contains a member selected from the group consisting of ruthenium, cobalt, chromium, tungsten, molybdenum, vanadium, iron, copper, nickel, and mixtures thereof, as a further alloying additive.

10. A membrane electrode unit according to claim 1, wherein the noble metal black contains the platinum group metal selected from the group consisting of platinum, palladium, rhodium and alloys of these platinum group metals.

11. A membrane electrode unit according to claim 10, wherein the noble metal black contains a member selected from the group consisting of ruthenium, cobalt, chromium, tungsten, molybdenum, vanadium, iron, copper, nickel, and mixtures thereof as further alloying additives.

12. A membrane electrode unit according to claim 10, wherein the metal surface area of the noble metal black is at least 15 $m^2/g$.

13. A membrane electrode unit according to claim 11, wherein the metal surface area of the noble metal black is at least 15 $m^2/g$.

14. A membrane electrode unit according to claim 12, wherein the metal surface area of the noble metal black is at least 30 $m^2/g$.

15. A membrane electrode unit according to claim 13, wherein the metal surface area of the noble metal black is at least 30 $m^2/g$.

16. A member electrode unit according to claim 1, wherein said noble metal black is present in the form of aggregates of primary metal particles.

17. A membrane electrode unit according to claim 2, wherein the proportion of noble metal black is 40 to 90 weight percent of the total noble metal content of the reaction layer in which the noble metal black is contained.

18. A membrane electrode unit according to claim 5, wherein the total thickness of a reaction layer is between 15 and 50 μm.

* * * * *